UNITED STATES PATENT OFFICE.

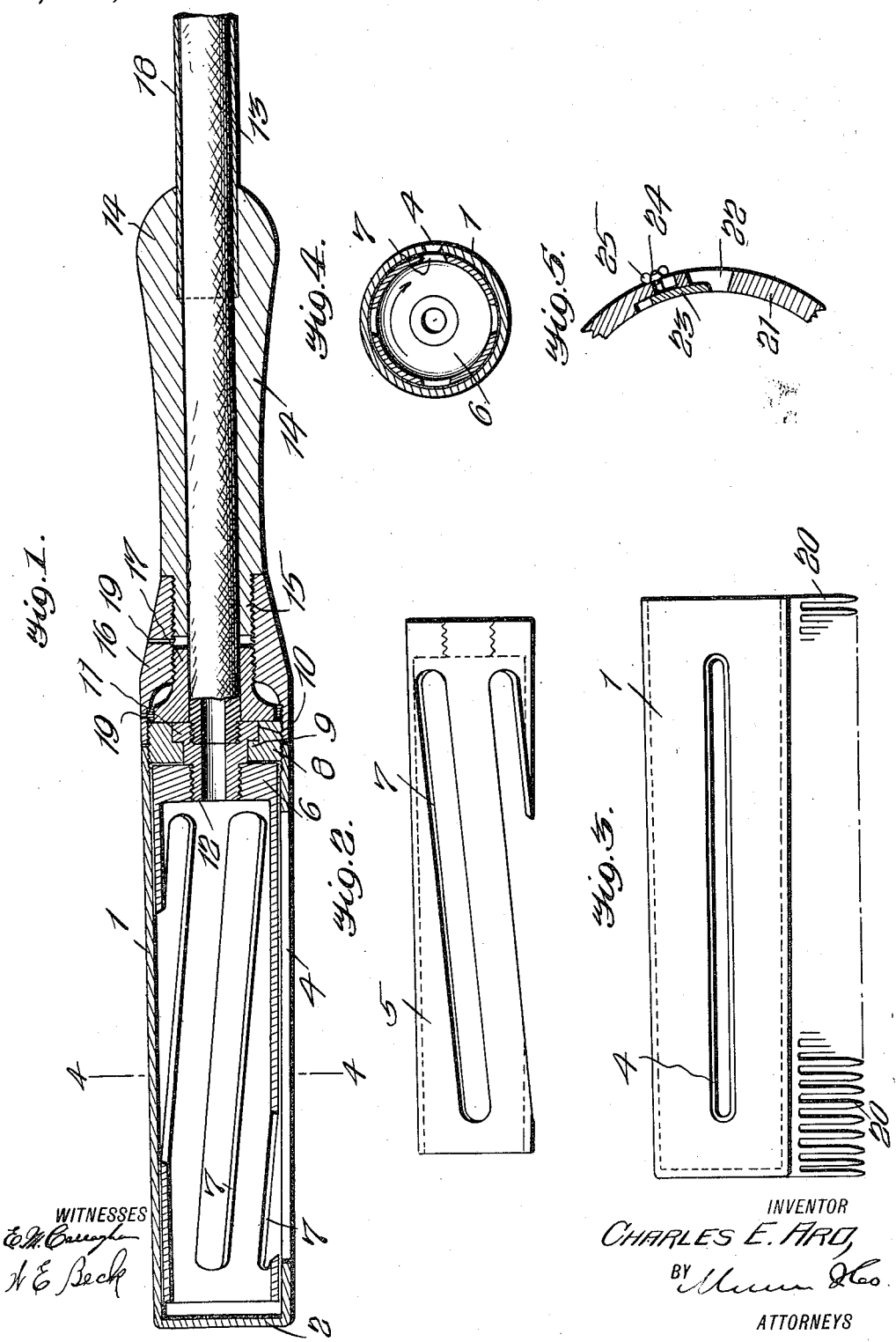

CHARLES E. ARD, OF BIRMINGHAM, ALABAMA.

CLIPPER.

1,211,273.  Specification of Letters Patent.  Patented Jan. 2, 1917.

Application filed August 25, 1916. Serial No. 116,843.

*To all whom it may concern:*

Be it known that I, CHARLES E. ARD, a citizen of the United States, and a resident of Birmingham, in the county of Jefferson and State of Alabama, have invented a certain new and useful Improvement in Clippers, of which the following is a specification.

My invention is an improvement in clippers, and has for its object to provide a mechanism of the character specified especially adapted for sanitary cutting and removal of hair, and designed also for use in clipping animals, furs, pile goods, and the like, wherein a fixed closed casing of circular form is provided, within which is mounted a rotatable cutter, the casing having means for permitting the contents thereof to be exhausted and having a cutting opening through which the hair is drawn when it is cut, the cutting member coöperating with the edge of the opening as a fixed or ledger blade.

In the drawings:—Figure 1 is a longitudinal section of the improved clipper; Fig. 2 is a side view of the cutting element; Fig. 3 is a side view of the casing with the comb attached; Fig. 4 is a section on the line 4—4 of Fig. 1, and Fig. 5 is an enlarged sectional detail of a modified form.

In the present embodiment of the invention, a circular casing 1 is provided having one end closed as indicated at 2, and having the other end internally threaded, as shown in Fig. 1. This casing is provided with a longitudinally extending opening 4 having beveled edges, as shown more clearly in Fig. 4, and the said casing tapers toward the closed end very slightly, for a purpose to be presently described.

The cutting element is also a substantially circular casing or sleeve 5 having one end open and having at the other an internally threaded hub 6. This casing or sleeve is provided with inclined or spirally arranged slots 7, four slots being provided in the present instance, and the slots have beveled edges, beveled in the opposite direction, however, to those of the opening 4. The sleeve or casing 5 is also tapered, tapering toward the open outer end and this sleeve or casing is adapted to fit within the casing 1 and to be rotatably mounted therein. A bushing 8 is threaded into the threaded end of the sleeve 1, and this bushing is provided with a central opening 9 having its outer end reamed or counterbored, as shown at 10. Within this opening is mounted a bearing 11, which is shaped to fit the opening 9—10, and the bearing has a reduced threaded stem 12 for engaging the threaded hub of the sleeve 5. The bearing 11 is cored as shown, and the end remote from the stem 12 is counterbored and internally threaded to receive one end of a hollow driving shaft 13, the bore of the shaft registering with the cored out portion of the bearing.

A grip or handle 14 encircles the shaft 13, providing a means for manipulating the clippers, and this grip has a reduced threaded stem 15 which engages within the outer end of a reducing ferrule 16. This ferrule, at its large end, is threaded onto the bushing 8, and a reducing collar 17 is arranged within the ferrule between the grip and the bearing 11. This collar has threaded engagement with the small end of the ferrule and that end of the collar adjacent to the bearing is enlarged and extended beyond the opening 10. The shaft 13 is flexible and a flexible covering 18 is provided for the shaft beyond the grip. The ferrule has openings 19 for oil, in such position that the oil may pass into the opening 9—10 and onto the shaft 13 near the collar.

In use, a suitable exhausting apparatus is connected with the shaft 13, so that the hair or fiber cut by the clippers will be drawn into the casing and will pass out at a suitable place of discharge through the hollow shaft.

It will be understood that the casing 1 might have other openings 4, if thought desirable, and a comb indicated at 20 may be connected with the casing, extending longitudinally thereof and radially therefrom for permitting the depth of the cut to be varied, by the use of the compass as a gage. If desired, the modified construction shown in Fig. 5 may be used. In this form the casing 21 has an opening 22 which is adapted to be varied in width by means of a cover plate 23. This cover plate has an arc-shape, and the said plate has threaded stems 24 which extend outwardly through circumferential slots in the casing 21 and are engaged by wing nuts 25. It will be evident that when the wing nuts are loosened the plate may be moved to vary the width of the slot.

In use the device is moved over the head when hair is cut, and it will be evident that, as the opening 4 passes over the hair, it will be drawn into the said opening and clipped. As the hair in advance of the cutter will be drawn into the opening, the hair will be clipped into small pieces which may easily pass out through the exhaust or discharge of the clippers. At the same time all dandruff, dust, and the like will be drawn through the clipper and discharged out with the hair. The depth of the cut may be regulated by means of the comb 20 or by turning the casing 1 so that the opening 4 is higher or lower, that is, near to or farther from the head. Since the cutting slots 7 of the casing 5 are inclined or spiral, they will not cut at the same time throughout their length, so that the clippers cannot become clogged.

The cutting edges of either element 1 or 5 may be sharpened by a file or stone, and wear tends to sharpen both cutting edges. The tapered form of the two elements permits wear to be compensated for. This is done by turning the ferrule off the element 8 and turning the casing 1 farther on. This brings the closed end of the casing 1 near the open end of the casing 5 and also brings the peripheral surface of the casing 5 closer to the interior of the element 1.

The thickness of the casing wall may also be used to regulate the depth of the cut, for it is obvious that with a very thin wall the hair or fiber will be cut close, while with a thicker wall the cut will be longer.

When the comb is used to regulate the depth of the cut, the teeth are placed in contact with the clippers, and it will be obvious that, as the comb is inclined, the cutting slot will be brought nearer to, or farther away from the clippers.

I claim:—

1. Clippers comprising inner and outer cylindrical casings, the outer casing having a longitudinally extending slot, and the inner casing having inclined slots for coöperating with the side walls of the slot of the outer casing to provide a cutting action, and means for rotatably connecting the said casings, the outer casing having one end closed, a hollow shaft connected with the opposite end of the inner casing for rotating the same and adapted to be connected to exhaust mechanism to withdraw the material cut, said casing tapering toward the closed end of the outer casing, and means in connection with the mounting of the said casings for permitting them to be adjusted longitudinally with respect to each other.

2. Clippers comprising inner and outer cylinrical casings, the outer casing having a longitudinally extending slot, and the inner casing having inclined slots for coöperating with the side walls of the slot of the outer casing to provide a cutting action, and means for rotatably connecting the said casings, the outer casing having one end closed, a shaft connected with the opposite end of the inner casing for rotating the same, said casing tapering toward the closed end of the outer casing, and means in connection with the mounting of the said casings for permitting them to be adjusted longitudinally with respect to each other.

CHARLES E. ARD.

Witnesses.
R. R. COLE,
J. S. GREEN.